United States Patent

[11] 3,621,002

| [72] | Inventor | James S. Ridgway<br>Pensacola, Fla. |
|---|---|---|
| [21] | Appl. No. | 780,280 |
| [22] | Filed | Nov. 29, 1968 |
| [45] | Patented | Nov. 16, 1971 |
| [73] | Assignee | Monsanto Company<br>St. Louis, Mo. |

[54] TRANSPARENT FIBER-FORMING COPOLYAMIDES
6 Claims, No Drawings

[52] U.S. Cl. .................................................. 260/78,
152/330, 260/33.4
[51] Int. Cl. .......................................... C08g 20/20
[50] Field of Search ............................................ 260/78

[56] References Cited
UNITED STATES PATENTS

| 3,294,759 | 12/1966 | Gabler.......................... | 260/78 |
|---|---|---|---|
| 3,352,834 | 11/1967 | Schmitt et al................. | 260/78 |
| 3,383,368 | 5/1968 | Ridgway...................... | 260/78 |
| 3,475,387 | 10/1969 | Carter et al................... | 260/78 |

*Primary Examiner*—Harold D. Anderson
*Attorneys*—George R. Beck and Stanley M. Tarter ABSTRACT: Copolyamides are prepared by polymerizing adipic acid, hexamethylene diamine, 3-(4-carboxyphenyl)-1,1,3-trimethyl-5-indan carboxylic acid and 3-aminomethyl-3,5,5-trimethyl-1-cyclohexylamine. Filaments made from such copolyamides are useful in reinforcing rubber articles such as pneumatic tires.

TRANSPARENT FIBER-FORMING COPOLYAMIDES

BACKGROUND OF THE INVENTION

Various polyamides such as polyhexamethylene adipamide (nylon 66) are well known in the art and widely used in the production of fibers for textiles, tire reinforcement cords, etc. However, substantial efforts are being continued to develop new polyamides having properties that are even more desirable for such uses. For example, known polyamides have an inherent drawback in their use in reinforcement of vehicle tires. That drawback is their tendency to flatspot, which is a term used to describe the out-of-roundness that occurs when a vehicle tire reinforced with polyamide fibers is at rest under weight for an extended period of time. The portion of the tire which is in contact with the ground becomes very slightly flattened and when the vehicle is put in motion again, the flat spot causes a bothersome vibration of the vehicle for a short period of time. While the exact cause of flatspotting is not fully understood it is recognized that the modulus of known polyamides is adversely affected by heat and moisture and that low modulus or loss of modulus under these conditions results in more pronounced flatspotting. Hence, it has long been a need in the art to provide a polyamide having a modulus which is not significantly reduced by heat and/or moisture.

Another characteristic that limits the versatility of the most commonly used polyamides is that they are opaque when cast in molded articles of substantial thickness. Accordingly, there is also a current need to develop new polyamides that are better suited for the numerous applications in which transparent plastics are required.

SUMMARY OF THE INVENTION

The present invention provides a random linear fiber-forming copolyamide of at least one aliphatic diamine having the formula $H_2N(CH_2)_mNH_2$ wherein $m$ is an integer from 2 to 12; at least one aliphatic dicarbonyl compound having the formula $ROC(CH_2)_nCOR$ wherein $n$ is an integer from 2 to 10 and R is hydroxy, $C_1$–$C_4$ alkoxy, amino or halogen; at least one cyclic diamine having the formula

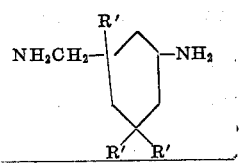

where R' is hydrogen or $C_1$–$C_3$ alkyl; and at least one phenylindan dicarbonyl compound having the formula

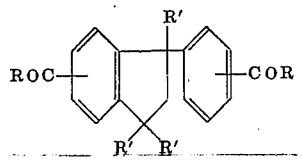

wherein R and R' have the aforedescribed significance.

DETAILED DESCRIPTION OF THE INVENTION

In general, the copolyamides of this invention are prepared from substantially equimolar proportions of the aforementioned diamines and dicarbonyl compounds. That is, the total moles of the aliphatic and cyclic diamines used as starting materials are substantially equivalent to the total moles of the aliphatic and phenylindan dicarbonyl reactants. In most cases, the cyclic diamine makes up from 1 to 20 mole percent of the total diamine starting materials, the phenylindan dicarbonyl compound constitutes from 1 to 20 mole percent of the total dicarbonyl reactants, and the resulting copolyamides are consequently composed of recurring units having the structure

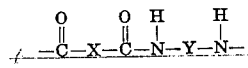

in which X is (A) a divalent polymethylene radical containing from two to 10 methylene groups or (B) a divalent radical having the formula

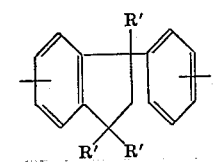

wherein R' is hydrogen or $C_1$–$C_3$ alkyl; and Y is (C) a divalent polymethylene radical containing from two to 12 methylene groups or (D) a divalent radical having the formula

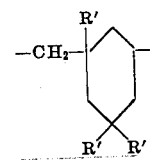

wherein R' has the aforedescribed significance; said copolyamides being further characterized in that X in 80 to 99 percent of said units is said radical (A), X in 1 to 20 percent of said units is said radical (B), Y in 80 to 99 percent of said units is said radical (C) and Y in 1 to 20 percent of said units is said radical (D).

Although the diamines and dicarbonyl starting materials may be combined for polymerization as unreacted compounds, they are desirably added to the reaction mixture in many cases as the preformed salts thereof, i.e., the salts formed by reacting equimolar quantities of one or more of the diamines with one or more of the dicarbonyl compounds. The polyamide forming conditions to which the reactants or salts thereof are subjected are normally the same as those employed in the manufacture of less complex polyamides. That is, the reactants or salts are heated at a temperature of from 180° C. to 300° C. and preferably from 200° C. to 295° C. until the product has a sufficiently high molecular weight to exhibit fiber-forming properties, which properties are reached when the copolyamide has an intrinsic viscosity of at least 0.4 as determined by the equation $$\text{Intrinsic viscosity} = C \xrightarrow{\lim} 0 \left( \frac{\log_e N_r}{C} \right)$$

in which $N_r$ is the relative viscosity of a dilute solution of the polymer in m-cresol in the same units at the same temperature and C is the concentration in grams of polymer per 100 cubic centimeters of the solution. The reaction can be conducted at superatmospheric, atmospheric or subatmospheric pressure. It is often desirable, especially in the last stage of the reaction, to employ conditions (e.g. reduced pressure) which aid in the removal of reaction byproducts. Preferably, the reaction is carried out in the absence of oxygen, for example, in an atmosphere of nitrogen. After a polymer having the desired molecular weight is made, it may be employed as a molding resin or it may be extruded into filaments which are normally subjected to orientation draw to provide optimum tenacity. Instead of proceeding immediately to filament formation or use as a molding resin after polymerization has been completed, the copolyamide can be solidified, if desired, and remelted later for the intended end use.

The diamines and dicarbonyl compounds which are used to prepare the copolyamides of this invention are well known in the art. Examples of the aliphatic diamines are ethylene diamine, tetramethylene diamine, hexamethylene diamine, octamethylene diamine, decamethylene diamine, dodecamethylene diamine and the like. Suitable cyclic diamines include 3-aminomethyl-1-cyclohexylamine, 3-aminomethyl-5-ethyl-1-cyclohexylamine, 3-aminomethyl-3-propyl-5-methyl-1-cyclohexylamine, 3-aminoethyl-5,5-diethyl-1-cyclohexylamine, 3-aminomethyl-3,5,5-trimethyl-1-cyclohexylamine and 3-aminopropyl-5,5-dimethyl-1-cyclohexylamine, any of which can be in the *cis* isomeric form, the *trans* isomeric form or mixtures thereof. The preferred cyclic diamine for the preparation of the copolyamides of this invention is 3-aminomethyl-3,5,5-trimethyl-1-cyclohexylamine which has the formula

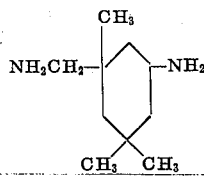

Suitable aliphatic dicarbonyl compounds include succinic, glutaric, adipic, pimelic, suberic, azelaic, sebacic, undecandioic and brasilic acids, the amides and lower alkyl (e.g. methyl, ethyl, propyl or butyl) esters thereof and the corresponding acid halides (e.g. chlorides). Suitable phenylindan dicarbonyl compounds include 3-(4-carboxyphenyl)-5-indan carboxylic acid, 3-(3-carboxyphenyl)-5-indan carboxylic acid, 3-(4-carboxy-phenyl)-1,1,3-trimethyl-5-indan carboxylic acid, 3-(3-carboxyphenyl)-1,1,3-triethyl-6-indan carboxylic acid, 3-(4-carboxyphenyl)-1-methyl-1,3-dipropyl-5-indan carboxylic acid, 3-(4-carboxyphenyl)-1-methyl-1,3-diethyl-6-indan carboxylic acid, the amides and lower alkyl esters thereof and the corresponding acid halides (e.g. chlorides). The preferred phenylindan dicarbonyl compound for the preparation of the copolyamides of this invention is 3-(4-carboxyphenyl)-1,1,3-trimethyl-5-indan carboxylic acid which has the formula

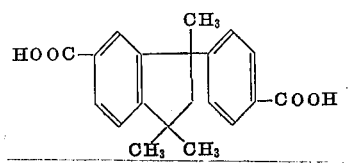

PREFERRED EMBODIMENTS OF THE INVENTION

In examples 1 and 2 and Comparative Example A, polymers were prepared by forming salts of the aforementioned diamines and dicarbonyl compounds and then subjecting the salts to polyamidation conditions in the molar proportions set forth in table I. In table I, 66 represents hexamethylene diammonium adipate, 6PDA represents the salt formed by reacting equimolar quantities of hexamethylene diamine and 3-(4-carboxyphenyl)-1,1,3-trimethyl-5-indan carboxylic acid and ATC6 represents the salt formed by reacting equimolar quantities of adipic acid and 3-aminomethyl-3,5,5-trimethyl-1-cyclohexylamine. In each example, the specified salts were dissolved in water in the desired proportions and the resulting solution was placed in a stainless steel, high-pressure autoclave previously purged with nitrogen. The temperature and pressure within the autoclave were slowly raised until values of 220° C. and 250 p.s.i.g., respectively, were reached. The temperature was then further increased to 243° C. while the pressure was maintained at 250 p.s.i.g. by removal of steam condensate. The pressure was then gradually reduced to atmospheric over a 25-minute period. The temperature was allowed to level out between 280° and 300° C. at which temperature the polymer melt was allowed to equilibrate for 30 minutes. The resulting polymer was melt spun directly from the bottom of the autoclave, yielding a monofilament yarn having excellent textile properties after being molecularly drawn. Samples of the yarns were conditioned at 30° C. with relative humidities of 0 percent and 30 percent. Sonic modulus values for these samples were determined. The humidity conditions were maintained but the temperature of the yarn was raised to the levels shown in tables II and III. Sonic modulus values were determined for the various samples of these temperatures.

Sonic modulus was determined by the pulse propagation technique described in the Textile Research Journal, Volume 29, page 525 (1959). Sonic modulus is defined therein in terms of grams per denier as equaling 11.3 times $C^2$ in which C is the velocity of sound in the polymer measured in kilometers per second. The sonic modulus values were measured at the given temperature and relative humidity and at a frequency of 14 kilocycles per second with 60 pulses per second while the filaments were under a low tension of 0.03 grams per denier.

The low adverse effect on the modulus of copolyamides of the present invention at higher temperatures and relative humidities is shown in tables II and III.

TABLE I

| Polymer | Mole percent | | | Melting pt., °C. (avg. of range) | Intrinsic viscosity |
| --- | --- | --- | --- | --- | --- |
| | 66 | 6PDA | ATC6 | | |
| 1 | 90 | 5 | 5 | 254 | 0.80 |
| 2 | 80 | 10 | 10 | 238 | 0.65 |
| A | 100 | 0 | 0 | 265 | 1.05 |

TABLE II.—0% RELATIVE HUMIDITY

| Polymer | Sonic modulus, g./d. at 30° C. | Percent modulus retained at— | | | | |
| --- | --- | --- | --- | --- | --- | --- |
| | | 50° C. | 80° C. | 110° C. | 130° C. | 150° C. |
| 1 | 47.5 | 93 | 86 | 77 | 69 | 55 |
| 2 | 45.2 | 93 | 87 | 79 | 72 | 57 |
| A | 60.8 | 87 | 78 | 64 | 56 | 48 |

TABLE III.—30% RELATIVE HUMIDITY

| Polymer | Sonic modulus, g./d. at 30° C. | Percent modulus retained at— | | | |
| --- | --- | --- | --- | --- | --- |
| | | 45° C. | 60° C. | 75° C. | 90° C. |
| 1 | 51.5 | 83 | 68 | 63 | 54 |
| 2 | 45.8 | 89 | 71 | 66 | 61 |
| A | 63.5 | 83 | 68 | 59 | 52 |

The results set forth in the tables above show that filaments made from copolyamides of the present invention have greater resistance to being adversely affected by heat and moisture. Tires reinforced by the filaments exhibit reduced flatspotting. The copolyamides of the present invention are also substantially transparent, whereas the polyhexamethylene adipamide of the comparative example is opaque.

I claim:

1. A substantially completely transparent linear fiber-forming copolyamide composed of recurring units being the structure

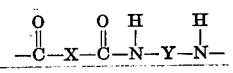

wherein X is (A) a divalent polymethylene radical containing from two to 10 methylene groups or (B) a divalent radical having the formula

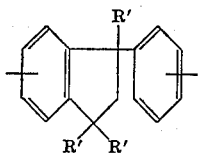

wherein R' is hydrogen or $C_1-C_3$ alkyl; and Y is (C) a divalent polymethylene radical containing from two to 12 methylene groups or (D) a divalent radical having the formula

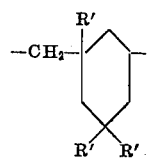

wherein R' has the aforedescribed significance; said copolyamide being further characterized in that X in 1 to 20 percent of said units is said radical (B) and Y in 1 to 20 percent of said units is said radical (D).

2. A copolyamide as defined in claim 1 wherein said radical (A) is a tetramethylene radical.

3. A copolyamide as defined in claim 1 wherein said radical (B) has the formula

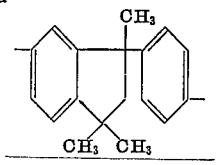

4. A copolyamide as defined in claim 1 wherein said radical (C) is a hexamethylene radical.

5. A copolyamide as defined in claim 1 wherein R' in said radical (D) is methyl.

6. A substantially completely transparent linear fiber-forming copolyamide composed of recurring units having the structure

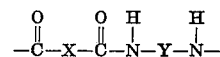

wherein X is (A) a tetramethylene radical or (B) a divalent radical having the formula

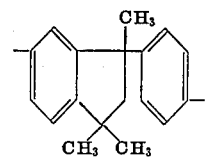

and Y is (C) a hexamethylene radical or (D) a divalent radical having the formula

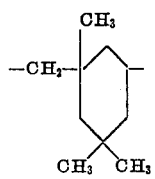

said copolyamide being further characterized in that X in 1 to 20 percent of said units is said radical (B) and Y in 1 to 20 percent of said units is said radical (D).

* * * * *